(12) United States Patent
Park

(10) Patent No.: US 6,870,683 B2
(45) Date of Patent: Mar. 22, 2005

(54) OPTICAL ILLUMINATION SYSTEM OF PROJECTOR USING OPTICAL DEVICE FOR HOMOGENIZING LUMINOUS ENERGY AND POLARIZED LIGHT

(75) Inventor: Tae Soo Park, Nnamyangju-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/214,189

(22) Filed: Aug. 8, 2002

(65) Prior Publication Data

US 2003/0030914 A1 Feb. 13, 2003

(30) Foreign Application Priority Data

Aug. 10, 2001 (KR) ........................................ 2001-48219

(51) Int. Cl.[7] .................... G02B 27/14; G02B 27/10; G03B 21/14
(52) U.S. Cl. ........................ 359/634; 359/627; 353/20
(58) Field of Search ................................. 359/620, 627, 359/629, 634, 636; 362/551, 561; 353/20, 81

(56) References Cited

U.S. PATENT DOCUMENTS 5,387,953 A * 2/1995 Minoura et al. .............. 353/20

6,478,431 B1 * 11/2002 Sawamura et al. ........... 353/81

FOREIGN PATENT DOCUMENTS

| JP | 2001042432 A | * | 2/2001 | ........... G03B/21/14 |
| JP | 02001311912 A | * | 9/2001 | ........... G02B/27/28 |

OTHER PUBLICATIONS

Computer Translation of JP2001–042432—"Optical System for Illumination"; Feb. 16, 2001; Sanyo.*

* cited by examiner

Primary Examiner—Georgia Epps
Assistant Examiner—Alicia M. Harrington
(74) Attorney, Agent, or Firm—Birch, Stewart, Kolasch & Birch, LLP

(57) ABSTRACT

An optical device capable of homogenizing luminous energy and homogenizing polarized light simultaneously, and an optical illumination system of a projector having decreased volume by using the optical device for homogenizing luminous energy and polarized light has small volume, but is able to homogenize luminous energy and transform non-polarized light a polarized light simultaneously. It is possible to attain homogeneous luminous energy and light efficiency improvement on a level, which are equal to those attained by using conventional Fly eye lens and PBS array, by using the above-described optical device for homogenizing luminous energy and polarized and the volume of the optical system can be decreased and be lightweight.

5 Claims, 3 Drawing Sheets

OPTICAL ILLUMINATION SYSTEM OF PROJECTOR USING OPTICAL DEVICE FOR HOMOGENIZING LUMINOUS ENERGY AND POLARIZED LIGHT

BACKGROUND OF THE INVENTION

1. Field of the Invention

The present invention relates generally to a optical illumination system of a projection system, and more particularly, to an optical device for homogenizing luminous energy and polarized light, and to an optical illumination system of a projector using the optical device whereby the volume of the optical illumination system of projector can be decreased.

2. Description of the Prior Art

Lately, as a substitution for a cathode-ray tube display which has the limits of screen size and bulky system, the supply of a projector, which is a kind of flat display having a relatively thin thickness but realizing capacity large sized screen, capable of magnifying and projecting a small picture on a large screen in size has rapidly increased.

Although a projector uses a display device, such as a cathode-ray tube, an LCD (Liquid Crystal Display), or a DMD (Digital Micro-mirror Device), capable of realizing a small picture in size, the LCD or the DMD is mainly used so as to satisfy thin-type trend.

The LCD realizes a picture by controlling the quantity of light transmission in accordance with the array of a liquid crystal that varies in response to change of electric signal applied from an external source. Then, the DMD realizes a picture by using two modes of the angle of reflection that are achieved by varying the angle of gradient of a micro-mirror between an angle of plus 10 degrees and an angle of minus 10 degrees in accordance with change of electric signal applied from an external source.

Such projector has developed on the basic axis of small size, lightweight, and high brightness.

Namely, so as to decrease in size and in weight, a projector develops from three flats type using three display devices into single flat type using one display device for realizing color.

The projector has also been improved so as to overcome the problem that clear screen could not be realized in bright circumstances. For example, a lamp as a light source has been improved into a lamp having a smaller emission in size, as shown in FIG. 1, light efficiency has improved by using Fly eye lens for homogenizing luminous energy, and polarized light transformer for transforming a light supplied from the light source into single linear polarized light.

FIG. 1 is a diagram showing the structure of the optical illumination system of a related art liquid crystal projector.

The structure and operation of the optical illumination system of a related art liquid crystal projector will now be described with reference to FIG. 1.

The optical illumination system includes a first and a second Fly eye lens (4, 6) arranged between a light source (2) and a display device (12) in series from the light source (2), a Polarizing Beam Splitter Array (hereinafter, a PBS array) (8), and a reverse Fourier transform lens (10).

The light source (2) includes an arc luminescence lamp (not shown) having small size luminescence and a parabolic reflection mirror (not shown). The arc luminescent white light from the light source (2) is reflected on the parabolic reflection mirror and travels to the first Fly eye lens (4) in a semi parallel light form.

The first and the second Fly eye lens (4, 6) include a plurality of sets of micro lens arranged in a matrix form.

An incident light from the light source (2) is divided through the first Fly eye lens (4) in terms of sets of lenses, and is incident over respective sets of lenses of the second Fly eye lens (6). The second Fly eye lens (6), which is a first focal length distant from the first Fly eye lens (4), transforms the incident light from the first Fly eye lens (4) into a parallel light and makes the parallel light travel to the PBS array (8). The second Fly eye lens (6) is also named Fourier transform lens.

By means of the first and the second Fly eye lens (4, 6), luminous energy incident over the display device (12) is homogenized.

The PBS array (8) divides an incident light from the second Fly eye lens (6) into linear polarized lights having an optical axis, that is, a vertical linear polarized light (hereinafter, P polarized light) and a horizontal linear polarized light (hereinafter, S polarized light).

FIG. 2 is a diagram showing a detailed structure of the PBS array (8).

The structure of the PBS array (8) and operations of dividing and homogenizing polarized light of the PBS array (8) will now be described with reference to FIG. 2.

The PBS array (8) includes a plurality of PBS prism bars (16) each of which has polarization division surface (18) obliquely installed between incident surface and emission surface for polarization dividing an incident light (14), and a plurality of a half wavelength plates (24) partially attached to the rear surface of the PBS array (8).

The incident light (14) incident on the PBS array (8) is divided as a result that a P polarized light (22) is transmitted and an S polarized light (20) is reflected on the polarization division surface (18) obliquely formed in the PBS prism bar.

In this way, the S polarized light (20) reflected on the first surface of the polarization division surface (18) is repeatedly reflected on the second surface of the polarization division surface (18) which is adjacent to the first surface, and is emitted like that through the emission surface of the PBS array (8). On the other hand, the P polarized light emitted through the polarization division surface (18) is transformed into S polarized light (20) and emitted by the half wavelength plates (24) partially attached to the rear surface of the PBS array (8).

Thus, incident lights are all transformed into a linear polarized light such as S polarized light by the PBS array (8), so that most light emitted from the light source (2) can be used for realizing a picture in the display device (12) such as liquid crystal panel using linear polarized light, and brightness can be improved consequently.

The PBS array (8) is attached to the rear surface of the second Fly eye lens (6) as one body.

The polarization divided and homogenized light transmitted through the PBS array (8) travels to the reverse Fourier transform lens (10).

Parallel incident S polarized light (20) from the PBS array (8) can be focused on the display device (20) in minimal angle of incidence by the reverse Fourier transform lens (10), so that the loss of light can be prevented.

In the optical illumination system having the above-described structure, the display quality of the display device (12) can be improved by using the Fly eye lens (4, 6) for homogenizing luminous energy and the PBS array (8) for homogenizing polarized light.

However, the Fly eye lens (4, 6) and the PBS array (8) have relatively bulky volume, so that the total volume of the optical system may be bulk. Thus, it is difficult to meet the small size and thin-type trend.

SUMMARY OF THE INVENTION

Accordingly, an object of the present invention is to substantially obviate one or more of the problems caused by limitations and disadvantages of the related art.

It is another object of the present invention to provide an optical device for homogenizing luminous energy and homogenizing polarized light simultaneously, and an optical illumination system of a smaller projector in size by using the optical device for homogenizing luminous energy and polarized light.

In accordance with the present invention, an optical device for homogenizing luminous energy and polarized light comprises a rod lens that has total reflection gradient surface for total reflecting an incident light in a direction perpendicular to the direction of incidence, and a polarization divider that has a wire polarizer and is obliquely installed in the rod lens. The rod lens comprises a medium having more refractive index than that of outer part for inner total reflection.

Further, the optical device further comprises a polarized light transformer, wherein a first polarized light totally reflected on the polarization divider is emitted through a first emission surface, and a second polarized light transmitted and divided through the polarization divider is totally reflected on the total reflection gradient surface and emitted through the second emission surface, and the polarized light transformer transforms the second polarized light emitted through the second emission surface into a light equal to the first polarized light.

In accordance with the present invention, an optical illumination system of a projector comprises a light source for emitting and focusing a light; an optical device for homogenizing luminous energy and polarized light has a rod lens that has total reflection gradient surface for total reflecting an incident light in a direction of emission perpendicular to the direction of incidence, and a polarization divider that has a wire polarizer and is obliquely installed in the rod lens; a Fourier transform lens having at least two sets of lenses corresponding to respective mutually different emission surfaces of the optical device for homogenizing luminous energy and polarized light for Fourier transforming an incident light; and a reverse Fourier transform lens for reverse Fourier transforming incident lights from respective at least two sets of lenses, and then superposing focusing them on the display device.

In accordance with the present invention, an optical device for homogenizing luminous energy and polarized light has small volume, but is able to homogenize luminous energy and transform non-polarized light a polarized light simultaneously.

Therefore, in the optical illumination system of projector according to the present invention, it is possible to attain homogeneous luminous energy and light efficiency improvement on a level, which are equal to those attained by using conventional Fly eye lens and PBS array, by using the above-described optical device for homogenizing luminous energy and polarized. However, the volume of the optical system can be decreased.

Consequently, it is possible to accomplish the downsized volume and lightweight of the projector by using the optical illumination system of the projector according to the present invention.

Additional advantage, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will be described in detail with reference to the following drawings in which like reference numerals refer to like elements wherein.

DETAILED DESCRIPTION OF THE PREFERRED EMBODIMENTS

Figure 1:
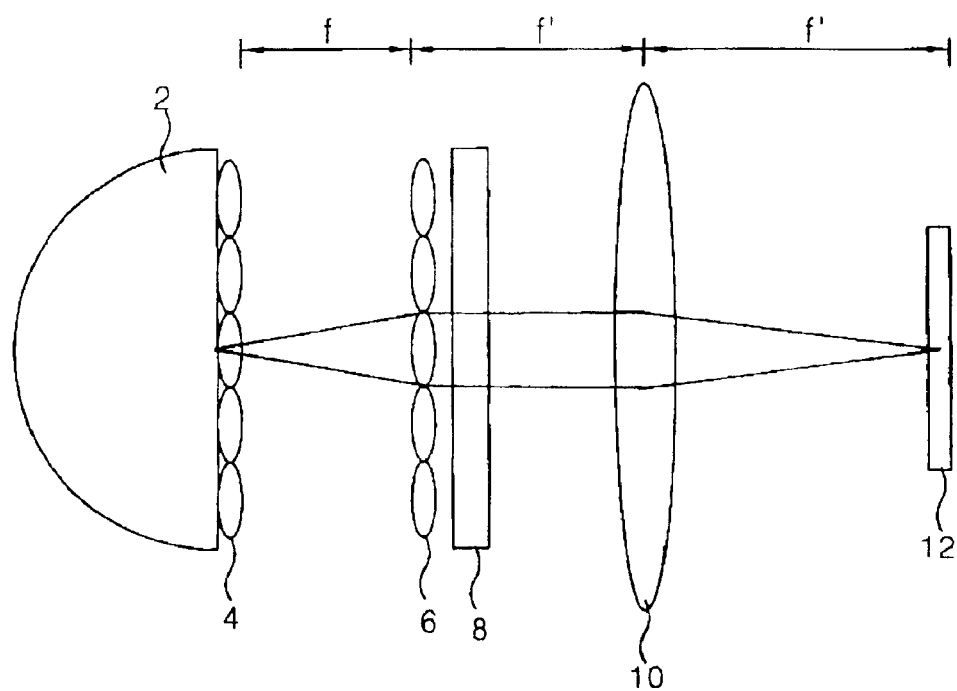
FIG. 1 is a diagram showing a structure of a related art optical illumination system of a projector.
Figure 2:
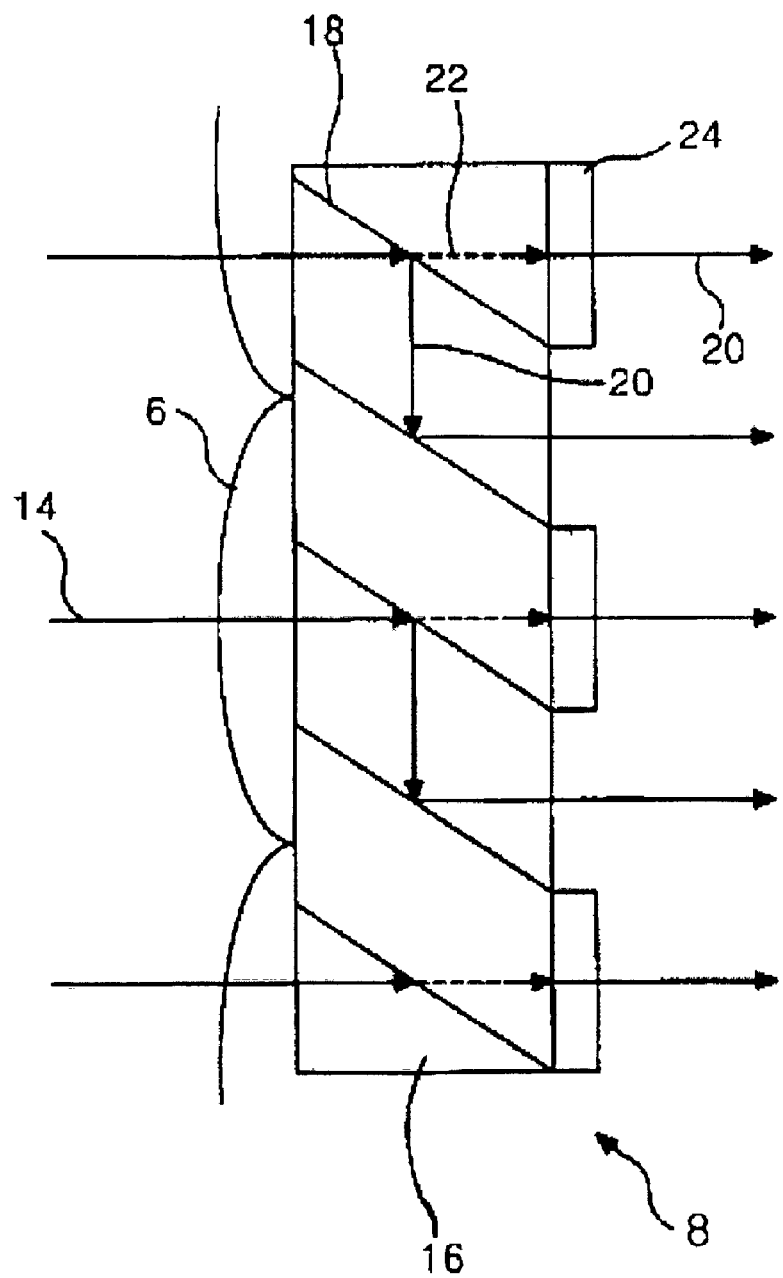
FIG. 2 is a diagram showing a detailed structure of a PBS array.

The preferred embodiment of the present invention will be described with reference to FIGS. 1 through 3.

Figure 3:
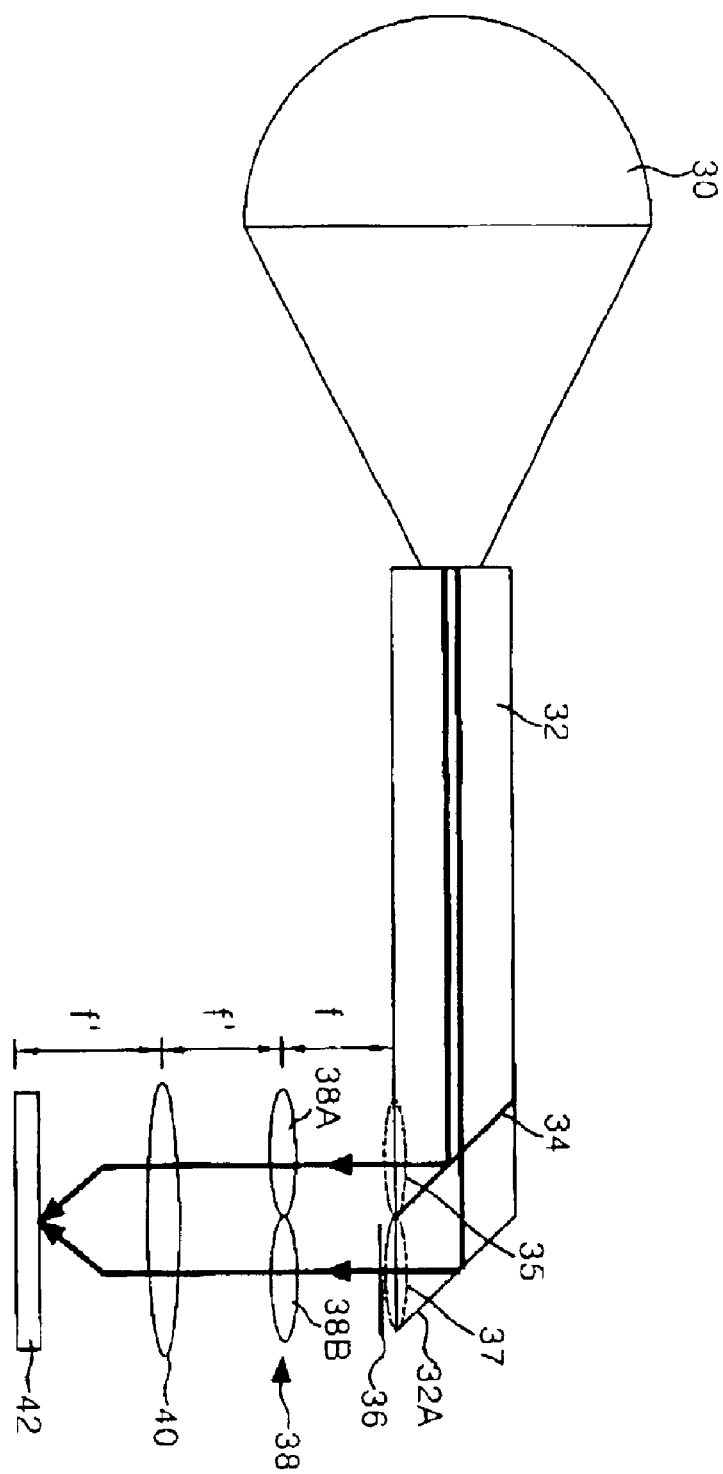
FIG. 3 is a diagram showing a structure of an optical illumination system of a projector using an optical device for homogenizing luminous energy and polarized light according to the present invention.

FIG. 3 is a diagram showing a structure of an optical illumination system of a projector using an optical device for homogenizing luminous energy and polarized light according to the preferred embodiment of the present invention.

Structure and operations of an optical illumination system of a projector using an optical device for homogenizing luminous energy and polarized light according to the preferred embodiment of the present invention will now be described with reference to FIG. 3.

As shown in FIG. 3, the present invention is disclosed embodied in an optical illumination system of a projector that comprises a Space Multiplexing Optical system including a Homogenizing and Polarizing Rod Lens (32) arranged on an optical path between a light source (30) and a display device (42) in series from the light source (30), a Fourier transform lens (38), and a reverse Fourier transform lens (40).

Further, the Homogenizing and Polarizing Rod Lens (32) comprises a half wavelength plate (36) arranged between a second emission surface thereof and the Fourier transform lens (38).

The light source (30) includes a lamp (not shown) for emitting light, and a reflection mirror (not shown) for total reflecting light emitted from the lamp to the Homogenizing and Polarizing Rod Lens (32). Light emitted from the lamp is reflected on the reflection mirror and travels to the Homogenizing and Polarizing Rod Lens (32).

The Homogenizing and Polarizing Rod Lens (32) divides a non polarized light into S polarized light and P polarized light as well as attains a homogenous luminous energy by repeatedly inner total reflecting an incident light focused and incident by means of the reflection mirror of the light source (30).

To achieve the above-described objects, the Homogenizing and Polarizing Rod Lens (32) has a relatively long length, and has a rectangular parallelepiped shape. Further, the Homogenizing and Polarizing Rod Lens (32) has a total reflection gradient surface (32A) for total reflecting an incident light in a direction of emission perpendicular to the direction of incidence, and has a polarization divider (34) obliquely installed inside of the Homogenizing and Polarizing Rod Lens (32).

The Homogenizing and Polarizing Rod Lens (32) comprises a medium having more refractive index (n>1) than that of outer part such as an air for inner total reflection. As a result, when an incident light incident on the Homogenizing and Polarizing Rod Lens (32) travels through the inner part thereof and then is incident on a boundary surface between the Rod lens (32) and the air at more angle than a critical angle, the incident light is totally reflected on the boundary surface.

As described above, the incident light on the Homogenizing and Polarizing Rod Lens (32) is repeatedly total reflected on the boundary surface, and then is incident on the polarization divider (34).

The polarization divider (34) divides non-polarized incident light into a S polarized light and a P polarized light, and then total reflects the S polarized light to a first emission surface (35) and transmits the P polarized light to the total reflection gradient surface (32A).

The polarization divider (34) includes a wire polarizer that has better angle characteristics than that of dichroic coating surface and heat resisting for dividing a polarized light. The wire polarizer has a conventional shape such that metallic wires such as Aluminum are in order arranged on a board in a space less than wavelength of an incident light for reflecting the S polarized light and transmitting the P polarized light.

The S polarized light totally reflected on the polarization divider (34) is incident on the first emission surface (35), namely, the boundary surface of the Homogenizing and Polarizing Rod Lens (32) at a less angle than a critical angle, and is emitted to outer part. The P polarized light transmitted through the polarization divider (34) is totally reflected on the total reflection gradient surface (32A), and emitted through a second emission surface (37) in the same method as the S polarized light.

In this case, a half wavelength plate (36), which is installed at the second emission surface (37) of the Homogenizing and Polarizing Rod Lens (32) in a space, transforms a P polarized light from the second emission surface (37) into a S polarized light, and then emits the S polarized light. Thus, an incident light from the light source (30) is transformed into S polarized light having homogenous luminous energy and is traveled by means of the Homogenizing and Polarizing Rod Lens (32) and the half wavelength plate (36), so that light efficiency can be improved.

The Fourier transform lens (38) of the Space Multiplexing Optical system according to the present invention comprises a first and a second sets of lenses (38A, 38B) that are arranged on optical paths corresponding to the first and the second emission surfaces (35, 37) in a first focal length (f) from the first and the second emission surfaces (35, 37), respectively.

The first and the second sets of lenses (38A, 38B) refract and emit an incident light on the Fourier transform principle. For example, respective sets of lenses (38A, 38B) refract and emit an incident light incident from a focal point having a first focal length (f).

Further, the reverse Fourier transform lens (40) of the Space Multiplexing Optical system according to the present invention, that is arranged on optical path in a second focal length (f) from the Fourier transform lens (38), focuses incident lights incident from respective sets of lenses (38A, 38B) on the display device (42). In this case, lights transmitted through the first and the second sets of lenses (38A, 38B) are emitted through the reverse Fourier transform lens (40), and superposed and focused on the display device (42), so that light efficiency can be improved.

The display device (42) realizes a picture by using S polarized light incident from the above-described optical illumination system, and magnifies and projects the picture through a projection lens (not shown).

As described above, in the optical illumination system shown in FIG. 3, it is possible to attain homogeneous luminous energy and light efficiency improvement on a level, which is equal to that attained by using conventional Fly eye lens and PBS array, by using the Homogenizing and Polarizing Rod Lens (32) capable of homogenizing luminous energy and transforming non-polarized light into a polarized light simultaneously. However, the volume of the optical system can be decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical illumination system of a projector where the optical illumination system provides light to the projector or magnifying and projecting a picture realized on a small display device, comprising:

a light source for emitting and focusing light;

an optical device for homogenizing luminous energy and polarized light, wherein the optical device is formed in a shape of a rod and transforms non-polarized incident light into a polarized light as well as homogenizes luminous energy by repeatedly inner total reflecting an incident light; and a space multiplexing optical device for superposing and focusing a light emitted from different emission surfaces of the optical device for homogenizing luminous energy and polarized light on the display device; and wherein the space multiplexing optical device comprises:

a Fourier transform optical device, which includes at least two sets of lenses corresponding to respective different lenses of the optical device for homogenizing luminous energy and polarized light, for Fourier transforming an incident light; and a reverse Fourier transform optical device for reverse Fourier transforming a plurality of incident lights from the at least two sets of lenses, and for superposing and focusing the plurality of incident lights on the display device.

2. The optical illumination system of a projector according to claim 1, wherein the Fourier transforms optical device and the reverse Fourier transform optical device are lenses.

3. An optical illumination system of a projector, comprising:

a light source for emitting and focusing light;

an optical device for homogenizing luminous energy and polarized light including a rod lens having a total reflection gradient surface for total reflecting an incident light in a direction of emission perpendicular to a direction of incidence, and a polarization divider, which includes a wire polarizer, obliquely installed inside of the rod lens;

a Fourier transform lens including at least two sets of lenses corresponding to respective different emission surface of the optical device for homogenizing luminous energy and polarized light for Fourier transforming an incident light; and a reverse Fourier transform lens for reverse Fourier transforming a plurality of incident lights from the at least two sets of lenses, and for superposing and focusing the plurality of incident lights on the display device.

4. The optical illumination system of a projector to claim 3, wherein the optical device for homogenizing luminous energy and polarized light has a medium having more refractive index than that of outer part for inner total reflection.

5. The optical illumination system of a projector to claim 3, further comprising a polarized light transformer, wherein a first polarized light totally reflected on the polarization divider is emitted through a first emission surface, and a second polarized light transmitted and divided through the polarization divider is totally reflected on the total reflection gradient surface and emitted through a second emission surface, and the polarized light transformer transforms the second polarized light emitted through the second emission surface into a light equal to the first polarized light.

* * * * *